PROCESS FOR PREPARATION OF 2α,3α-EPITHIOSTEROID

The present invention relates to 2α,3α-epithiosteroids. More particularly, it relates to a novel process for the preparation of 2α,3α-epithiosteroids, products thereof and pharmaceutical preparations containing the products of this invention.

The novel process of the present invention for the preparation of 2α,3α-epithiosteroids comprises the reaction of a thiocyanogen halide with a Δ²-5α-steroid of the estrane, androstane or pregnane series to afford (2 or 3)α-thiocyanato-(3 or 2)β-halo-5α-sterOids or its derivatives, followed by treatment of the product under basic conditions.

The known process for preparation of 2α,3α-epithio-5α-steroids involves a process starting from a 3-oxo-5α-steroid compound prepared from the corresponding 3-hydroxy-compound by oxidation, in which the starting material is halogenated and reduced to its 3-oxo group to give a halohydrin, and the latter is treated with a base to afford an epoxide, the epoxide is then treated with thiocyanic acid to give thiocyanatohydrin, which is treated with a base to afford the desired compound; and a process starting from a 3-oxo-5α-steroid compound, in which the starting material is halogenated, the introduced halogen atom is replaced with thiocyanato group, the oxo group is reduced to give thiocyanatohydrin, and the latter is treated with a base to afford desired compound. Total yields of both of the processes are lower because of e.g. multiplied unit processes, possible side reaction causing lower yield such as halogenation at undesired position, and so on in the former process, and e.g. lower yield of replacement reaction of halogen atoms with thiocyanato group and undesired halogenation in the halogenation step in the latter process.

The reaction of the present invention is represented e.g. by the following reaction scheme for ring A of the steroid nucleus:

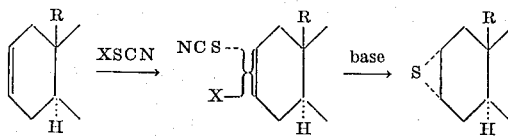

wherein X is a halogen atom and R is a methyl group or hydrogen atom. In the reaction of the first step, as the thiocyanato cation attacks the double bond mainly from α-side, the thiocyanato group of the products occupies mainly at α-positions, and as the result, the products of the second step have mainly epithio groups of α-configuration.

The process of the present invention comprises as the first step reacting a thiocyanogen halide on the Δ²-steroid; and as the second step reacting base on the products of the first step.

As for the starting materials of the present invention, the Δ²-steroid of estrane, androstane or pregnane series, preparable for example by dehydration of the corresponding 3-hydroxy compounds, are utilized. They can possess a conventional inert substituent, e.g. a lower hydrocarbon group hydroxyl group, acyloxy group, alkoxy group, oxo group, alkylenedioxy group, halogen atom, unsaturated bond, nitrogen or sulfur functions and the like at any position in the steroid nucleus in addition to the double bond at position 2(3). Representatives of these materials are as follows 5α-androst-2-en-17β-ol,
17α-methyl-5α-androst-2-en-17β-ol,
17α-ethyl-5α-androst-2-en-17β-ol,
17α-propyl-5α-androst-2-en-17β-ol,
17α-ethynyl-5α-androst-2-en-17β-ol,
1α-methyl-5α-androst-2-en-17β-ol,
2-methyl-5α-androst-2-en-17β-ol,
3-methyl-5α-androst-2-en-17β-ol,
7α-methyl-5α-androst-2-en-17β-ol,
8β-methyl-5α-androst-2-en-17β-ol,
18-methyl-5α-androst-2-en-17β-ol,
7α17α-dimethyl-5α-androst-2-en-17β-ol,
5α-androst-2-ene-6β,17β-diol,
5α-androst-2-ene-7α,17β-diol,
17α-methyl-5α-androst-2-ene-6β,17β-diol,
17α-methyl-5α-androst-2-ene-7α,17β-diol,
5α-androsta-2,6(7)-dien-17β-ol,
5α-androsta-2,9(11)-dien-17β-ol,
17-methylene-5α-androst-2-en-17β-ol,
17α-methyl-5α-androsta-2,6(7)-dien-17β-ol,
17α-methyl-5α-androsta-2,9(11)-dien-17β-ol,
17α-ethyl-5α-androsta-2,9(11)-dien-17β-ol,
5α-estr-2-en-17β-ol, 17α-methyl-5α-estr-2-ene-17β-ol,
5α-pregn-2-en-20-one,
9α-fluoro-5α-pregn-2-ene-20-one,
17α-hydroxy-5α-pregn-2-en-20-one,
16α,17α-dihydroxy-5α-pregn-2-en-20-one,
17α-hydroxy-5α-pregn-2-ene-11,20-dione,
17α,21-dihydroxy-5α-pregn-2-en-20-one,
9α-fluoro-17α,21-dihydroxy-5α-pregn-2-en-20-one,
6β-fluoro-17α,21-dihydroxy-5α-pregn-2-ene-20-one,
6β-methyl-9α-fluoro-17α,21-dihydroxy-5α-pregn-2-en-20-one, and their esters, ethers oxygenated compounds especially in the case of androstan-17β-ol derivatives, the corresponding 17-oxo derivatives.

The ester group in the starting materials may be an organic or inorganic acylate such as alkanoate, e.g. acetate, propionate, enanthate, dodecanoate, etc.; alicyclic acylates, e.g. cyclopropylcarboxylate, adamantoate, etc.; unsaturated acylate, e.g. ethynylacetate, undecenoate, etc.; aromatic acylate, e.g. benzoate, substituted benzoate, etc.; substituted alkanoates, e.g. phenoxyacetate, chloroacetate, phenylpropionate, etc.; sulfonates, e.g. methanesulfonate, ethanesulfonate, benzenesulfonate, toluene-p-sulfonate, etc.; or inorganic acylates, e.g. carbonate, phosphate, sulfate, etc.; and ethers or acetals may be ether, e.g. 1-alkoxycycloalkyl ether, cycloalkenyl ether, tetrahydropyranyl ether, methyl ether, etc.; or acetal, e.g. dimethyl ketal, methylene ketal, ethylene ketal, etc. The reagent of the process of the present invention, a thiocyanogen halide is thiocyanogen chloride, thiocyanogen bromide or the like. These are conveniently prepared by the methods described e.g. in Journal of the Chemical Society, page 318, 1960, for example by the reaction of alkali thiocyanate and halogen or by the reaction of thiocyanogen and halogen.

The first step of the process of the present invention is carried out by reacting a thiocyanogen halide on the said starting material. The reaction of this step is carried out by bringing the starting material into contact with the thiocyanogen halide. This reaction weakly exothermic and may be carried out at room temperature or at a lower temperature. Five to a hundred mole equivalents of the reagent give preferable results. The reaction medium can be stirred or kept under inert gas. The reaction can be carried out in a solvent. The solvents used in this step may be hydrocarbons, e.g. petroleum ether, heptane, toluene, benzene, etc.; halogenated hydrocarbons, e.g. carbon tetrachloride, chloroform, methylene chloride, dichloroethane, chlorobenzene, etc.; ethers, e.g. diethyl ether, tetrahydrofuran, dioxane, etc.; esters, e.g. ethyl acetate, butyl acetate, etc.; alcohols, e.g. menthanol, ethanol, butanol, etc.; organic acids, e.g. acetic acid, propionic acid, etc.; organic bases, e.g. pyridine, collidine, etc.; and other solvents, e.g. dimethylformamide, nitrobenzene, acetonitril, water, etc., or mixtures thereof. Sometimes preferable results are obtained when the reaction medium is anhydrous. When the reaction of this step was carried out in acetic acid, the reaction proceeded very rapidly. After 30 minutes, the mixture began to show slow secondary changes and a shorter reaction period was preferable. When the solvent can form an anion, e.g. acetate ion, the anion from the solvent instead of reacting with the halogen ion, reacts with the thiocyanato carbonium ion to some extent and affords products such as acetylated thiocyanatohydrins which may be converted to the same 2α,3α-epithio compound by reaction of the second step. If desired, the products of the first step are subjected to the reaction of the second step without purification or separation of in-

DECONTAMINATION OF REACTION SOLUTIONS CONTAINING DISSOLVED ORGANIC EXPLOSIVES

This invention relates to the removal of residual explosive contaminants from spent reaction solutions utilized in the manufacture of certain organic explosives. More particularly, this invention relates to the removal of residual quantities of cyclotetramethylenetetranitramine (hereinafter referred to as HMX) and cyclotrimethylenetrinitramine (hereinafter referred to as RDX) from spent reaction solutions by the selective adsorption of the RDX and HMX on activated charcoal.

During the manufacture of various organic explosives large quantities of spent reaction solutions are produced. Regeneration of these solutions is desirable both from the standpoint of economics and because of the difficulty of successfully disposing of these solutions without polluting the environment. A significant problem associated with regeneration of these solutions is the small amount of explosives which remains dissolved in the solution. These explosives are present in such small amounts that recovery is difficult, yet the amount present is sufficient to produce a significant hazard if the spent reaction solutions are improperly handled. For example, in the Bachmann process, one embodiment of which is characterized by Canadian Pat. No. 590,851, utilized for the manufacture of RDX and HMX, the spent reaction solution commonly referred to as "spent acid" contains acetic acid, ammonium nitrate, nitric acid, other inorganic salts, various reaction by-products and small amounts of dissolved product explosives RDX and HMX. Much work has been directed to removal of these dissolved explosive components. Various agents have been utilized as salting out agents in attempts to remove the dissolved explosive through precipitation. Cooling of the spent acid also fails to precipitate significant amounts of these dissolved explosives. Unsatisfactory results are also obtained when the spent acid is diluted with water.

Surprisingly, it has been discovered that the dissolved RDX and HMX are selectively adsorbed on activated carbon and may be rapidly and economically removed from the remaining components of the spent acid. Subsequently, the adsorbed RDX and HMX may be easily and economically recovered from the carbon and the carbon regenerated for further use by washing the carbon in a solvent such as acetone. The RDX and HMX are then recovered from the acetone through a simple stripping operation.

Therefore, an object of this invention is to reduce the level of these dissolved explosives to a point where the residual reaction solutions can be safely regenerated.

Another objective of this invention is to recover the small amounts of the dissolved explosives contained in the residual reaction solutions, thereby improving the yield of the manufacturing process.

In the practice of the process of this invention spent acid from the explosives' manufacturing process which is contaminated with residual amounts of dissolved explosives is brought into intimate contact with finely divided activated carbon. Any method of obtaining this intimate contact such as a slurry mixer; a packed column; pulsed-bed; or other type apparatus suitable for solid-liquid contacting may be used. Adsorption works well at ambient temperature and pressure although other temperatures and pressures may be used as desired. Contact time is a function of the extraction equipment used but will normally be of the order of a few minutes (1 to 10). Following the extraction, the spent acid may be recycled to the explosives' manufacturing process. Subsequently, the activated carbon may be regenerated by dissolving the adsorbed explosive in a suitable solvent such as acetone or cyclohexanone. The dissolved explosives are readily recovered from the solvent by distilling off the solvent leaving the explosives as a crystalline residue.

In a preferred embodiment of this invention, spent acid from the Bachmann process for the manufacture of RDX and HMX is used as the feed. Typically, this acid will comprise 15–65 percent acetic acid, small amounts of ammonium nitrate, nitric acid, other inorganic salts, various minor reaction products and dissolved RDX and HMX. This acid feed is passed through an extraction column packed with granular (retained on USSS No. 22) activated carbon. Analysis shows the effluent spent acid to be essentially free of dissolved RDX and HMX. This spent acid may then be regenerated and recycled into the manufacturing process. Periodic control checks are made on the effluent acid, and when these checks show small amounts in the order of 1 to 10 ppm or RDX or HMX, the flow of spent acid is diverted to a parallel extraction tower and the first tower is regenerated by passing acetone through it to dissolve and remove the adsorbed explosives.

The surprising efficiency of this invention will be better understood by reference to the following examples:

EXAMPLES I–IX

About 80 grams of fresh activated carbon is packed in a 1½-inch diameter glass column. A spent acid solution, typical of spent acid produced in the Bachmann process and containing 159 ppm dissolved RDX and HMX explosives, is drawn through the column at 25° C. using a vacuum flask. Approximately 7 liters pass through the column in a period of 25 minutes. The solution which passes through is collected and analyzed for RDX and HMX content. The results are contained in Table I.

TABLE I

| Example | Cumulative Volume Through Carbon in Milliliters | RDX-HMX Content (in ppm) | |
|---|---|---|---|
| | | Initial | Final |
| I | 200 | 159 | 0 |
| II | 1200 | 159 | 0 |
| III | 2100 | 159 | 0 |
| IV | 3000 | 159 | 0 |
| V | 3100 | 159 | 0 |
| VI | 5000 | 159 | 0 |
| VII | 5900 | 159 | 0 |
| VIII | 6700 | 159 | 0 |
| IX | 7100 | 159 | 0 |

EXAMPLES X–XII

The procedure of Examples I–IX is repeated utilizing spent acid containing 1,600 ppm dissolved RDX and HMX. The results of these tests are contained in Table II.

TABLE II

| Example | Cumulative Volume Through Carbon in Milliliters | RDX-HMX Content (in ppm) | |
|---|---|---|---|
| | | Initial | Final |
| X | 100 | 1690 | 0 |
| XI | 200 | 1690 | 0 |
| XII | 300 | 1690 | 3 |

The surprising efficiency of carbon over a wide range of dissolved explosives' concentration is illustrated by the test results presented in Tables I and II.

EXAMPLES XIII–XXI

The procedure of Examples I–IX is again repeated except this time the carbon employed has been previously utilized and regenerated by washing with acetone. Spent acid with a range of from 181–264 ppm dissolved HMX and RDX is used. The results of these tests are presented in Table III.

TABLE III

| Example | Cumulative Volume Through Carbon in Milliliters | RDX-HMX Content (in ppm) | |
|---|---|---|---|
| | | Initial | Final |
| XIII | 100 | 264 | 0 | bonate and water, dried over anhydrous sodium sulfate and evaporated to dryness under reduced pressure. Separation of 1.473 g of the residue by thin-layer chromatography gives 677 mg of 2β-chloro-3α-thiocyanato-17α-acetyloxy-11,20-dioxo-5α-pregnane (m.p. 207°–209° C. $[\alpha]_D^{23}$ + 52.4 ± 0.9° (c = 1.019, chloroform). IR: $\nu_{max}^{CHCl_3}$ 2143, 1738, 1710, 1246 cm$^{-1}$) from fraction of higher Rf value and 357 mg of 2β,17α-diacetyloxy-3α-thiocyanato-11,20-dioxo-5α-pregnane (m.p. 227°–230° C. $[\alpha]_D^{23}$ + 63.2 ± 1.1° (c = 0.996, chloroform). IR: $\nu_{max}^{Nujol}$ 2144, 1731, 1700, 1263 cm$^{-1}$) from the fraction of lower Rf value.

2. To a solution of 318 mg of 2β-chloro-3α-thiocyanato-11,20-dioxo-17α-acetyloxy-5α-pregnane in a mixture of 5 ml of dioxane and 5 ml of methanol is added a solution of 300 mg of potassium carbonate in 2 ml of water, and the mixture is stirred for 4 hours at room temperature. The reaction mixture is diluted with iced water and extracted with methylene chloride. The extract solution is washed with water, dried over anhydrous sodium sulfate and evaporated to dryness under reduced pressure. Separation of the residue by thin-layer chromatography over silica gel affords 206 mg of 2α,3α-epithio-11,20-dioxo-17α-acetyloxy-5α-pregnane (m.p. 167°–169° C. $[\alpha]_D^{23}$ + 37.1 ± 0.8° (c = 0.973, chloroform). IR: $\nu_{max}^{Nujol}$ 1732, 1709, 1245 cm$^{-1}$) from fraction of higher Rf value and 46 mg of 2α,3α-epithio-11,20-dioxo-17α-hydroxy-5α-pregnane (m.p. 183°–185° C. $[\alpha]_D^{23}$ + 39.3 ± 0.8° (c = 0.971, chloroform). IR: $\nu_{max}^{Nujol}$ 3570, 3516, 1700 cm$^{-1}$) from fraction of lower Rf value, accompanied with 2-ene compound. 3. To a solution of 254 mg of 2β,17α-diacetyloxy-3α-thiocyanato-11,20-dioxo-5α-pregnane in a mixture of 5 ml of dioxane and 5 ml of methanol is added a solution of 300 mg of potassium carbonate in 2 ml of water, and the mixture is stirred at room temperature for 3.5 hours. The reaction mixture is diluted with iced water and extracted with methylene chloride. The extract solution is washed with water, dried over anhydrous sodium sulfate and evaporated to dryness under reduced pressure. Separation of the residue by thin-layer chromatography affords 105 mg of 2α,3α-epithio-17α-acetyloxy-11,20-dioxo-5α-pregnane, m.p. 167°–169° C, and 36 mg of 2α,3α-epithio-17α-hydroxy-11,20-dioxo-5α-pregnane, m.p. 183°–185° C.

EXAMPLE 7

To a solution of 1.5 g of chlorine in 80 ml of glacial acetic acid is added 2.5 g of potassium thiocyanate, and the mixture is stirred for 10 minutes at room temperature. To the solution is added a suspension of 1.50 g of 5α-pregn-2-ene-20-one in 20 ml of glacial acetic acid, and the mixture is stirred at room temperature for 1 hour. The reaction mixture is poured onto iced water and extracted with methylene chloride. The extract solution is washed with water, 10 percent aqueous solution of sodium carbonate and water, dried over anhydrous sodium sulfate and evaporated to dryness under reduced pressure. To a solution of 1.3 g of the residue in a mixture of 20 ml of dioxane and 20 ml of methanol is added 0.9 g of sodium carbonate in 4.5 ml of water and the mixture is stirred at room temperature for 6 hours. The reaction mixture is diluted with water and extracted with methylene chloride. The extract solution is washed with water, dried over anhydrous sodium sulfate and evaporated to dryness under reduced pressure. Purification of 1.21 g of the residue by thin-layer chromatography over silica gel and recrystallization from acetone and hexane affords 1.14 g of 2α,3α-epithio-5α-pregnan-20-one, m.p. 160°–162° C/193°B197° C. Yield: 69 percent.

EXAMPLE 8

According to a similar procedure to that of Example 7, 17α-acetyloxy-5α-pregn-2-en-20-one is reacted with thiocyanogen chloride in glacial acetic acid for 1 hour, followed by treatment of the product with potassium carbonate in a mixture of methanol and dioxane for 12 hours to afford 2α,3α-epithio-17α-acetyloxy-5α-pregnan-20-one, m.p. 169°–171° C, in 60 percent yield; 17α-hydroxy-21-acetyloxy- 5α-pregn-2-ene-11,20-dione is treated with thiocyanogen chloride in glacial acetic acid for 1.5 hours, followed by treatment of the product with sodium carbonate in a mixture of methanol and dioxane for 6 hours to afford 2α,3α-epithio-21-acetyloxy-17α-hydroxy-5α-pregnane-11,20-dione, m.p. 146°–147° C and 2α,3α-epithio-21,17α-dihydroxy-5α-pregnane-11,20-dione, m.p. 152°–154° C, in 73 percent yield.

What we claim is:

1. A process for preparation of 2α,3α-epithio-5α-steroid of the estrane, androstane or pregnane series which comprises reacting a Δ$^2$-5α-steroid with a thiocyanogen halide, followed by treatment of the product with a basic medium.

2. A process claimed in claim 1, wherein the thiocyanogen halide is thiocyanogen chloride.

3. A process claimed in claim 1, wherein the thiocyanogen halide utilized is five to a hundred mole equivalents of thiocyanogen chloride.

4. A process claimed in claim 1, wherein the basic condition is obtained with an alkali metal carbonate or hydroxide.

* * * * *